(12) United States Patent
Fujinawa et al.

(10) Patent No.: US 7,307,765 B2
(45) Date of Patent: Dec. 11, 2007

(54) IMAGE READING APPARATUS

(75) Inventors: Nobuhiro Fujinawa, Yokohama (JP); Takuya Shirahata, Yokohama (JP)

(73) Assignee: Nikon Corporation, Tokyo (JP)

( * ) Notice: Subject to any disclaimer, the term of this patent is extended or adjusted under 35 U.S.C. 154(b) by 861 days.

(21) Appl. No.: 10/403,025

(22) Filed: Apr. 1, 2003

(65) Prior Publication Data

US 2004/0042048 A1  Mar. 4, 2004

Related U.S. Application Data

(63) Continuation of application No. 09/983,413, filed on Oct. 24, 2001, now abandoned, which is a continuation of application No. 09/000,957, filed on Dec. 30, 1997, now abandoned.

(30) Foreign Application Priority Data

Jan. 16, 1997  (JP)  ................................ 9-005387

(51) Int. Cl.
*H04N 1/04* (2006.01)

(52) U.S. Cl. ...................................... 358/487; 358/506

(58) Field of Classification Search ................ 358/487, 358/488, 496, 498, 506; 355/75; 348/96; 396/387, 392, 394–396, 400, 401, 403, 404, 396/411, 417
See application file for complete search history.

(56) References Cited

U.S. PATENT DOCUMENTS

| | | | | |
|---|---|---|---|---|
| 4,134,675 A | * | 1/1979 | Oosake et al. | 355/54 |
| 5,223,890 A | * | 6/1993 | Sakakibara et al. | 355/75 |
| 5,420,700 A | * | 5/1995 | Maeda et al. | 358/496 |
| 5,565,912 A | * | 10/1996 | Easterly et al. | 348/96 |
| 5,614,986 A | * | 3/1997 | Yoshikawa et al. | 355/18 |
| 5,933,222 A | * | 8/1999 | Hoshino et al. | 355/75 |

FOREIGN PATENT DOCUMENTS

JP   05075922 A  *  3/1993

* cited by examiner

*Primary Examiner*—Cheukfan Lee
(74) *Attorney, Agent, or Firm*—Oliff & Berridge, PLC

(57) ABSTRACT

An image reading apparatus can read images on film and is capable of alternating between 35 mm film and a roll of film. The apparatus includes a light source, a photoelectric converter, a film transport that transports film past a reading position to which the light is emitted and the photoelectric converter reads, and two insertion openings. The light source illuminates the film so that the photoelectric converter can read the illuminated images and output an image signal. The film transport transports the film to the reading position. A first insertion opening is used for inserting a roll of film (e.g., in a cartridge), while a second insertion opening is used for inserting 35 mm film (e.g., on a film mount).

18 Claims, 5 Drawing Sheets

IMAGE READING APPARATUS

This is a Continuation of application Ser. No. 09/983,413 filed Oct. 24, 2001, now abandoned which in turn is a Continuation of application Ser. No. 09/000,957 filed Dec. 30, 1997 now abandoned. The entire disclosure of the prior application(s) is hereby incorporated by reference herein in its entirety.

INCORPORATION BY REFERENCE

The disclosure of the following priority application is herein incorporated by reference: Japanese Patent Application No. 9-005387, filed Jan. 16, 1997.

BACKGROUND OF THE INVENTION

1. Field of Invention

The invention relates to an image reading apparatus, and relates in particular to an image reading apparatus for reading the images on film.

2. Description of Related Art

An image reading apparatus for reading the images on film photographed by a camera is conventionally known as a film scanner. Typically, the film scanner receives commands from a host computer, reads the images on the negative, or reversal film and outputs the images to the host computer. The host computer will then display the images on a monitor screen.

After conventional 35 mm film is developed, the film is normally returned to the user in either strip form or housed in a slide mount. Hence, film scanners for 35 mm film are generally structured to read images on film while the film is housed in a slide mount. In the situation where the film is in strip form, the film scanner is designed to read the images while. the film is housed in a special film holder.

In general, film scanners for 35 mm film have an anchored (stationary) optical system for reading the images and a transport stage for moving the film across the optical system. Typically, the film is transported across the optical system while holding the slide mount, or special film holder. Film scanners such as these have been very popular because of their low price. However, in recent years, a new film system has been developed.

The new film system handles a continuous strip of film having a magnetic memory area. The film is housed in a cartridge and is commonly known as a roll of film. The roll of film is convenient in that the user does not need to pull the roll of film directly from the cartridge when placing the film in the camera, but rather, is able to take photographs by simply loading, or dropping, the cartridge into the camera. In addition, when the roll of film is developed using the new film system, the film is returned to the user with the developed film still housed in the cartridge. In other words, the user handles the cartridge and never touches the film roll, even after developing.

In response to the new film system, film scanners have been proposed to specifically read the images on a roll of film housed in a cartridge as compared to the film scanners for conventional 35 mm film. An example of such a film scanner was disclosed in Japanese Laid-Open Patent Publication No. 5-75922. When using the disclosed film scanner, the user merely loads the cartridge into the film scanner and the roll of film housed in the cartridge is automatically scrolled out. The roll of film is then moved across the optical system so the images on each frame can be read.

As described above, there are two types of film scanners, those for 35 mm film and those for the new film system. However, there are situations where it is inconvenient to use both types of film scanners.

Thus, the manner in which 35 mm film and a roll of film are inserted into a film scanner differ. It would therefore be beneficial to develop a single film scanner which can accommodate 35 mm film as well as a roll of film. To achieve such a goal requires designing an apparatus that takes into consideration the various differences between 35 mm film and a roll of film. For example, 35 mm film is typically inserted into a film scanner while housed in flat holding means, such as, for example, a slide mount. In contrast, a roll of film is normally inserted into a film scanner while housed in a cylindrical cartridge.

In addition, 35 mm film is transported through the film scanner while being secured by holding means that must be inserted into the film scanner. Contrarily, the roll of film itself is scrolled out of the cartridge and transported through the film scanner. Thus, the structure of the transport means for 35 mm film and a roll of film differ due to the film form each type of film requires during transport. Consequently, it is necessary to structure an apparatus so that the transport means is compatible with both types of film.

Therefore, an apparatus which enables both types of film to be inserted into the same apparatus is desired.

SUMMARY OF THE INVENTION

In order to overcome the shortcomings in the prior art mentioned above, according to one aspect of the invention, it is an object of the invention to provide an image reading apparatus capable of easily reading images from 35 mm film and a roll of film.

It is another object of the invention to provide an image reading apparatus having various types of insertion openings for different types of film, making it possible to handle them easily.

It is yet another object of the invention to provide an image reading apparatus having a transport means capable of being used with different types of film, making it possible to simplify the structure of the apparatus.

Furthermore, it is another object of the invention to be able to adjust the transport means according to the type of film inserted into the apparatus to properly transport the film.

In particular, according to a first aspect of the invention, an image reading apparatus includes an illumination means for illuminating a roll of film or 35 mm film. In addition, the apparatus also includes image reading means, transport means and first and second insertion openings. The image reading means is capable of reading the images illuminated by the illumination means as well as outputting an image signal. The transport means transports the roll of film or the 35 mm film to the reading position of the image reading means. The first insertion opening of the apparatus is for inserting the roll of film while the second insertion opening is for inserting the 35 mm film.

According to a second aspect of the invention, an image reading apparatus includes the illumination means and an image reading means. A first transport means includes two rollers arranged opposite each other having a spacing wider than the thickness of the film. The first transport means spaces the rollers apart for interposing a holding means for holding the 35 mm film between the two rollers and transporting the film to the reading position of the image reading means. The second transport means includes winding means for winding the roll of film using one of the above two rollers so that the roll of film may also be transported to the reading position.

According to a third aspect of the invention, an image reading apparatus also includes an illumination means and an image reading means. A control means controls the spacing between the opposing rollers of the transport means. The control means provides a first spacing when a roll of film is being transported and a second spacing when the holding means containing 35 mm film is being transported. Alternatively, the spacing between the two rollers may be narrower than the thickness of the holding means. Additionally, the holding means for the 35 mm film may either be a slide mount or a film holder.

In operation of the image reading apparatus according to the invention, a roll of film is inserted into a first insertion opening. The transport means then transports the film, frame-by-frame, so that it can be read at the reading position. The illumination means illuminates the frame that is currently in the reading position, making it possible to read the image on the illuminated frame using the image reading means. Upon completion of the image reading, the roll of film is ejected from the first insertion opening.

When reading the images of 35 mm film, the film is inserted into a second insertion opening. The film is then transported to the image reading position similar to the manner in which the roll of film is transported. The images are also read in a similar manner. Upon completion of the image reading, the 35 mm film is ejected from the second insertion opening.

Thus, it is possible to directly insert or eject both the roll of film and the 35 mm film from their respective insertion openings and read the images from both film types using a single apparatus while handling the film types easily.

In operation of the image reading apparatus according to the invention, the holding means for the 35 mm film that is inserted into the apparatus is transported through the apparatus while being interposed between opposing rollers. In addition, the roll of film that is inserted into the apparatus is transported through the apparatus by being wound using one of the opposing rollers having a spacing wider than the thickness of the film.

Thus, the transport means for the roll of film and 35 mm film both use one of the opposing rollers, making it possible to read images from both film types using a single illumination means and image reading means. Consequently, the structure of the image reading apparatus is simple and both film types may use the same transport path.

In operation of the image reading apparatus according to the invention, when a roll of film is inserted into the apparatus, the spacing of the two rollers is adjusted to a first spacing. The frame of the film that is to be read is then transported to the reading position using one of the opposing rollers. In addition, when 35 mm film is inserted into the apparatus, the spacing between the opposing rollers is adjusted to a second spacing. The holding means is then transported to the reading position using the opposing rollers.

Thus, it is possible to adjust the transport means in accordance with the type of film that is to be transported.

It should be noted that for the image reading apparatus according to the invention, the spacing of the opposing rollers may be set narrower than the thickness of the holding means. Hence, it is possible to transport the holding means by interposing such with an appropriate spacing. In addition, it is possible for the holding means to use either the frame of a slide mount or a film holder for holding the 35 mm film.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
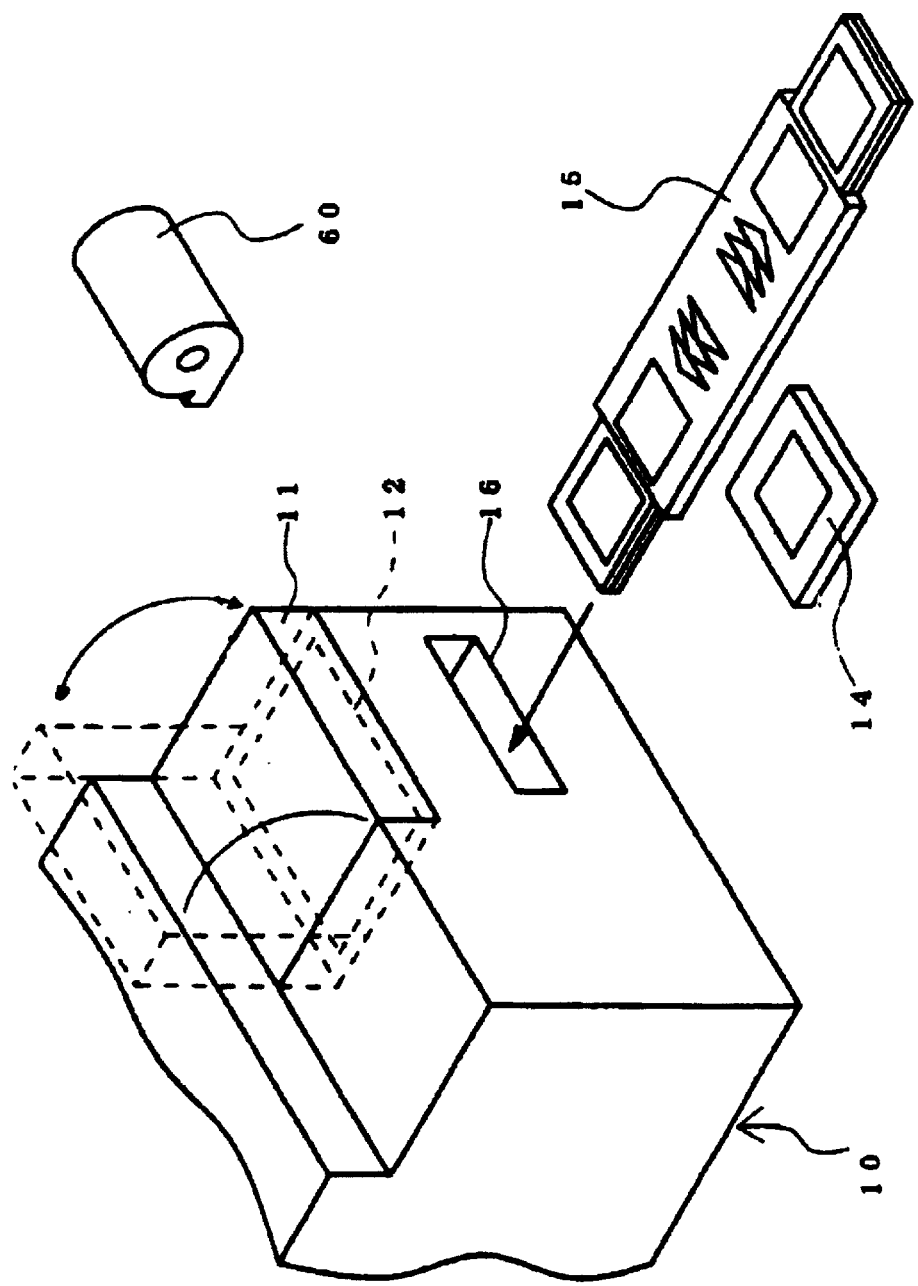
FIG. 1 is a perspective view of an image reading apparatus with a lid in dashed lines shown in an open and closed position, according to one embodiment of the invention.

While the invention will hereafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

Hereafter, a detailed description of embodiments of the image reading apparatus of this invention is provided with reference to the drawings. In the drawings, like reference numerals have been used throughout to designate like elements.

Figure 2:
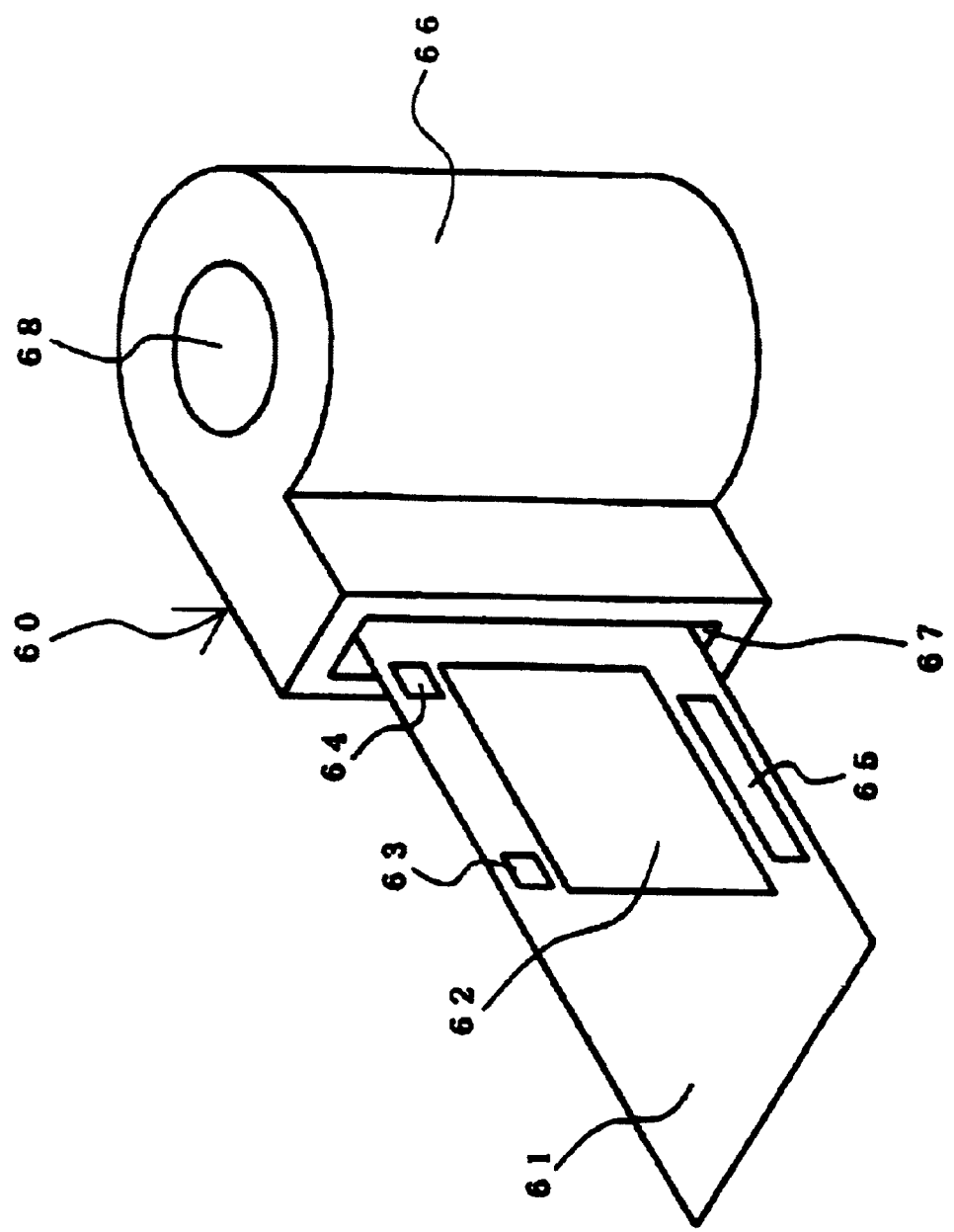
FIG. 2 is a perspective view of a film cartridge and roll film.

FIGS. 1 and 2 are perspective views of an image reading apparatus and a film cartridge and roll of film, respectively. Referring to FIG. 1, a lid 11 is shown in an open and closed position, according to the preferred embodiment of the invention. As shown in FIG. 2, a roll of film 61 in the new film system has an image memory area 62, two perforations 63 and 64 and a magnetic memory area 65 for each frame. The perforations 63 and 64 designate the start and end positions of the image memory area 62 in a lengthwise direction of the roll of film 61. In each magnetic memory area 65, information relating to the photograph, such as, the frame number, title, date the photograph was taken, conditions under which the photograph was taken and designated print size are recorded.

The cartridge 60, which houses the roll of film 61, is provided with a slit-sshaped opening 67 on the side of the cylindrical case 66. Furthermore, inside the case 66 is a cartridge spool 68 axially supported on both ends of the case 66 in a lengthwise direction so as to rotate freely. One end of the roll of film 61 is anchored to the cartridge spool 68, and the film 61 is housed in the case 66 by being wound around the cartridge spool 68. Additionally, the roll of film 61 enters and leaves the cartridge 60 through the opening 67 according to the forward or reverse rotation of the cartridge spool 68.

In addition, a disk (not shown) is provided on a side of the case 66. The disk is an indicator that displays film information in an optically readable manner (e.g., the disk can include a bar code). The film information includes, for example, the type of film and whether or not the roll of film 61 has been developed. The information indicating the type of film includes, for example, whether the film is negative or positive, color or monochrome, model number and film manufacturer.

With the new film system, the roll of film 61 is always completely housed in the cartridge 60 while being handled by the user. In fact, the film 61 is inserted into the insertion opening of the image reading apparatus while still housed in the cartridge 60. Only after the cartridge 60 has been inserted will the film 61 be extracted.

Figure 3:
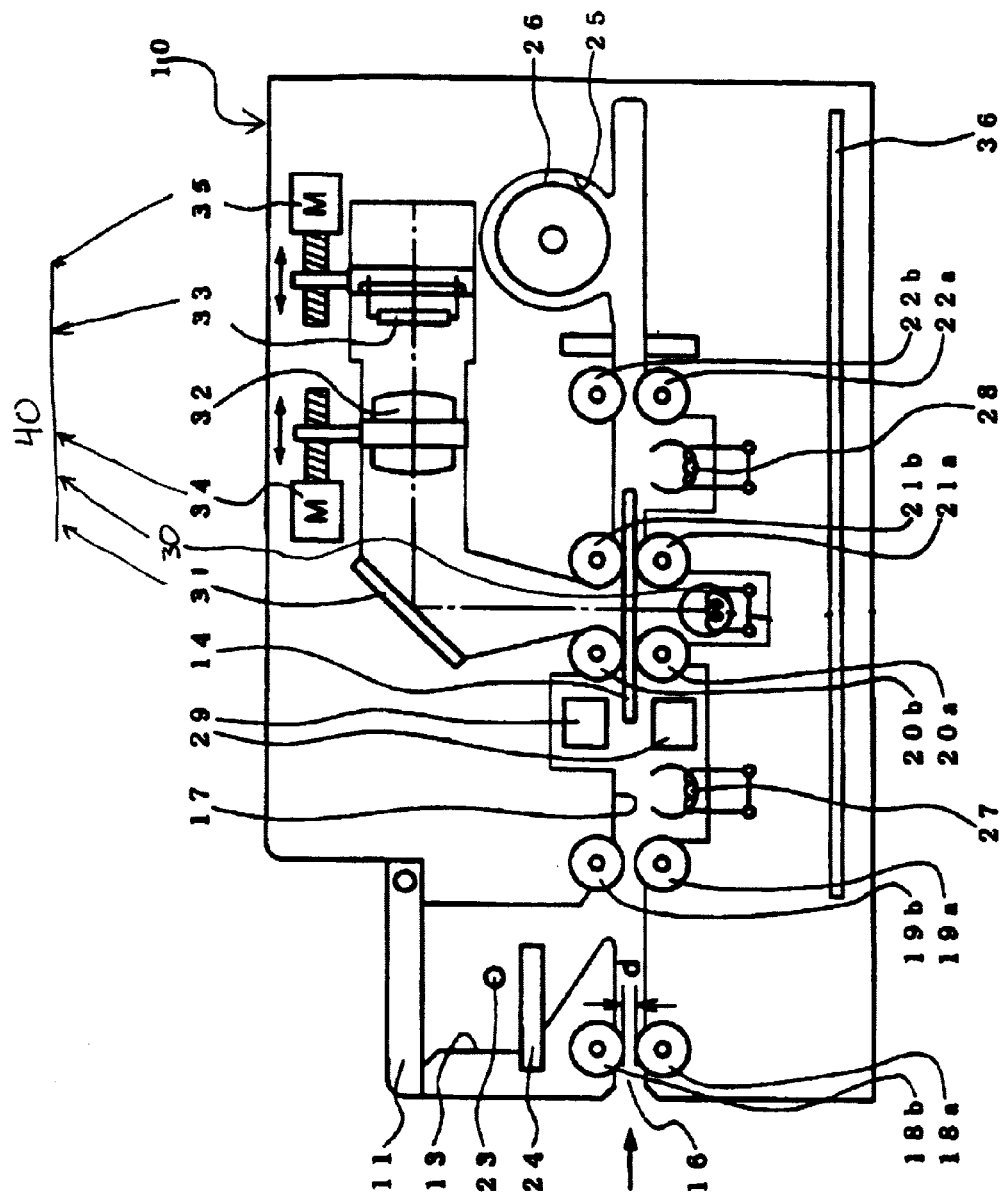
FIG. 3 is a cross-sectional view of the image reading apparatus according to the first embodiment of the invention, with mounted 35 mm film loaded therein.
Figure 4:
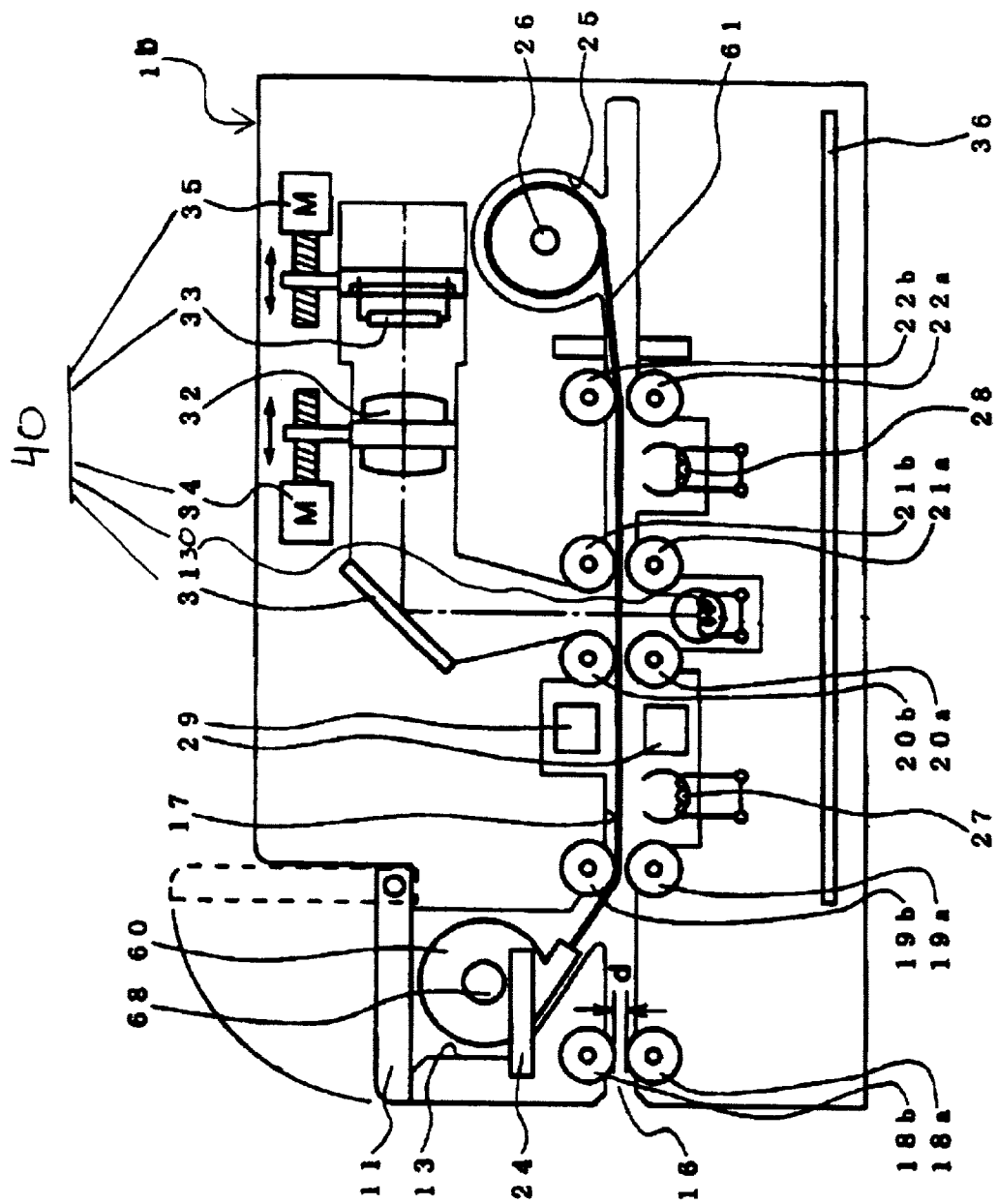
FIG. 4 is a cross-sectional view of the image reading apparatus with the lid shown in an open position, according to the first embodiment of the invention, with a cartridge of film loaded therein.

As illustrated in FIGS. 1, 3-4, a lid 11 is provided on the top surface of the image reading apparatus 10 to open and close a loading chamber 13 that is configured to match the external shape of the cartridge 60. A cartridge insertion opening 12 is provided in the loading chamber 13 and is visible when the lid 11 is opened, as shown by the dashed lines in FIG. 1. Alternatively, insertion and extraction of 35 mm film from the image reading apparatus 10 is accomplished while the 35 mm film is housed in a flat slide mount 14, or film holder 15, of predetermined thickness. Therefore, a separate insertion opening 16 is provided for the 35 mm film.

The 35 mm film insertion opening 16 is provided in the front surface of the image reading apparatus 10. The opening 16 is configured in the shape of a slit to match the shape of the slide mount 14 or film holder 15.

As shown in FIGS. 3 and 4, the image reading apparatus 10 has a film transport path 17 which forms the route of the slide mount 14, or film holder 15, once inserted into the opening 16. The film transport path 17 includes five pairs of rollers, 18a and 18b, 19a and 19b, 20a and 20b, 21a and 21b and 22a and 22b. Each roller pair 18-22 is arranged such that each roller pair 18-22 opposes each other on the upper and lower side of the film transport path 17. The lower side rollers 18a-22a will be hereinafter called the first rollers 18a-22a and the upper side rollers 18b-22b will hereinafter be called the second rollers 18b-22b.

The space between the first rollers 18a-22a and the second rollers 18b-22b is set to a constant value larger than the thickness of the film 61 in the roll of film and slightly narrower than the thinnest part of the slide mount 14 or film holder 15, having an approximate thickness of 1 mm. The space between the roller pairs 18-22 is set narrower than the thickness of the slide mount 14 or film holder 15, but since each roller 18a-22b is made of an elastic material, such as, for example, rubber, it is possible for the slide mount 14 or film holder 15 to be interposed between the roller pairs 18-22 through the deformation of the rollers 18a-22b.

The rotation shaft of each roller 18a-22b is anchored to the apparatus 10. The rotation shafts of the first rollers 18a-22a comprise drive shafts that are independently rotated (i.e., driven) in the forward or reverse direction. Contrarily, the rotation shafts of the second rollers 18b-22b are slave shafts. Therefore, when the first rollers 18a-22a are rotated in the forward direction, the slide mount 14 or film holder 15 is transported along the film transport path 17 from the opening 16 toward the image reading position. Additionally, when the first rollers 18a-22a are rotated in the reverse direction, the slide mount 14 or film holder 15 is transported along the film transport path 17 from the image reading position back toward the opening 16. The image reading position is the position where the line sensor 33 reads the film. The image reading position is where the film and the extension line of the optical axis of the projection lens 32 intersect.

The loading chamber 13 for the cartridge 60 is positioned above the film transport path 17. The loading chamber 13 is provided with a cartridge motor 23. The cartridge motor 23 is positioned in the chamber 13 so that the motor 23 engages the cartridge spool 68 after the cartridge 60 has been inserted into the loading chamber 13. Therefore, the roll of film 61 is scrolled from the cartridge 60 through the film transport path 17 by driving the cartridge motor 23 forward. Additionally, the roll of film 61 may be rewound into the cartridge 60 by driving the cartridge motor 23 in reverse.

A film information reading sensor 24 is also provided in the loading chamber 13. The film information reading sensor 24 detects the film information displayed on the disk (not shown) of the cartridge 60 that has been inserted into the loading chamber 13 prior to the apparatus 10 reading the images. The sensor 24 permits the image reading apparatus 10 to optimally set viewing conditions prior to reading the images on the roll of film 61.

A winding chamber 25 for the roll of film 61 is provided above the film transport path 17 and on the opposite side of the fifth roller pair 22a and 22b from the image reading position. A winding spool 26 and a DC motor (not shown) that rotationally drives the winding spool 26 are provided in the winding chamber 25. A gear mechanism (not shown) links the rotation shaft of the winding spool 26 to the rotation shaft of the cartridge motor 23. Therefore, after the tip of the roll of film 61 has been wound onto the winding spool 26, the remaining unwound portion of the roll of film 61 is transported along the film transport path 17 by the forward driving of the DC motor (not shown). The remaining portion of the roll of film 61 is then wound onto the rotation shaft of the winding spool 26 such that the roll of film 61 is housed inside the winding chamber 25.

It should be noted that the path over which the roll of film 61 is initially transported merges with the film transport path 17 for the slide mount 14 or film holder 15 in front of the roller pair 19a and 19b. From the point the two paths merge to the fifth roller pair 22a and 22b, the transport path 17 for both film types is the same.

In addition, magnetic sensors 27 and 28 and an optical sensor 29 are arranged along the film transport path 17. The magnetic sensors 27 and 28 read the information relating to the photograph that is stored in the magnetic memory area 65 of the roll of film 61. The information that is read is used in the image revision and setting of the scan conditions for each frame. The optical sensor 29 detects the perforations 63 and 64 in the roll of film 61 from which a central processing apparatus (not shown), or CPU, determines which frame the film 61 is currently positioned for reading. The CPU also controls the transporting of the film 61.

Furthermore, an illuminating light source 30 is provided between the third roller pair 20a and 20b and the fourth roller pair 21a and 21b and below the film transport path 17. The illuminating light source 30 is provided with light-emitting diodes, for example, in the colors red, green and blue. The illuminating light source 30 is also capable of alternately lighting the three color light-emitting diodes. When the roll of film 61 or the 35 mm film is positioned at the image reading position, the light from the illuminating light source 30 illuminates one line of the film's frame. The direction of the single line is orthogonal to the transport direction of the film, in other words, the direction orthogonal to the secondary scanning direction.

The light that illuminates the film undergoes an optical path change by means of a reflective mirror 31 provided above the film transport path 17. The light is then incident on a line sensor 33 by the projection lens 32. The sensor 33 functions as an imaging means. The light sensor can be a photoelectric converter such as, for example, a CCD, a photo-sensitive diode (PSD) or a CMOS device.

In the case where the illuminating light source 30 is provided with three colors of light-emitting diodes, the line sensor 33 is composed of an image accumulation unit (not shown) and a monochromatic image sensor (not shown). The image accumulation unit has a plurality of photoelectric conversion units lined up in a row, while the monochromatic image sensor is provided with a transfer unit that transfers the electric charge accumulated in the image accumulation unit.

The scanning direction of the electric charge accumulated in the line sensor 33 is the main (primary) scanning direction. The main scanning direction matches the direction of the photoelectric conversion units, which, in other words, is the lengthwise direction of the line sensor 33.

The one line illuminated by the illuminating light source 30 is read by the line sensor 33. In order to obtain the image of one frame, a line sequence is used where the same line position is read three times by alternating in sequence the emitted light color from the illuminating light source. In addition, the image is obtained by repeatedly moving the film one line at a time. Alternatively, a screen sequence may be used where an entire frame is read for each emitted light color.

Instead of using three different color emitters, the illuminating light source 30 may be designed to accomplish three color decomposition. The illuminating light source 30 can be provided with a white light source, filters in the three colors red, green and blue and a mechanism for alternating the three color filters. In this embodiment, the line sensor 33 may have a monochromatic image sensor. In addition, it would also be possible to have the illuminating light source 30 contain a white light source and the line sensor 33 have a color image sensor. This alternative makes it possible for the image reading apparatus to read the three colors simultaneously.

Although the disclosed imaging means is a line sensor 33, it is possible for the imaging means to have a two-dimensional area sensor. This alternative makes it possible to transport the film in frame units (rather than line-by-line).

The projection lens 32 is coupled to and supported by the rotation shaft of the motor 34. The lens 32 can move in the direction of its optical axis accompanying rotation of the rotation shaft. The line sensor 33 is coupled to and supported by the rotation shaft of the motor 35. The position of the light-receiving surface of the line sensor 33 can move in the direction of the optical axis of the projection lens 32 accompanying rotation of the rotation shaft. By controlling the motors 34 and 35 independently, it is possible to adjust the reading range and resolution.

Hereafter, the illuminating light source 30, reflective mirror 31, line sensor 33, and motors 34 and 35 together will be referred to as the image reading optical system 40.

A circuit board 36 is provided below the film transport path 17. Provided on the circuit board 36 is a circuit for controlling the rotational driving of the first rollers 18a-22a, a circuit for controlling the rotational driving of the cartridge motor 23 and winding spool 26, a circuit for driving the lighting of the illuminating light source 30, a circuit for driving the line sensor 33, a signal processing circuit and a CPU. The various driving circuits follow instructions from the CPU.

The operation of the image reading apparatus 10 according to the first embodiment of the invention will now be described.

A user wanting to read images on 35 mm film housed in a slide mount 14 first inserts the slide mount 14 into the 35 mm film opening 16 of the image reading apparatus 10, as indicated by the arrow in FIG. 3. When the tip of the slide mount 14 reaches the first roller pair 18a and 18b, the slide mount 14 is interposed between the roller pair 18a and 18bby the forward rotation of the first roller 18a. Upon reaching the second roller pair 19a and 19b, the slide mount 14 is moved along the film transport path 17 by the forward rotation of the first roller 19a. The slide mount 14 reaches the image reading position where it is also interposed between the third roller pair 20a and 20b. The images on the 35 mm film housed in the slide mount 14 are then read by the image reading optical system 40. The transport speed of the slide mount 14 is predetermined.

Upon finishing reading the images, the first rollers 18a-22a are successively driven in reverse such that each of the roller pairs 18-22 transports the slide mount 14 interposed between them, until the slide mount is ejected from the opening 16.

In addition, when reading the images of 35 mm film, the user may also place the 35 mm film in a special film holder 15 and insert the film holder 15 into the opening 16 of the image reading apparatus 10 in a manner similar to the film mount 14 described above. Hence, this film holder 15 is similarly interposed by each of the roller pairs 18-22 in succession and moved along the film transport path 17. Upon reaching the image reading position, the image on one frame of the 35 mm film is read. After the film images have been read, the film holder 15 is ejected from the opening 16.

Slide mounts 14 and film holders 15 may have various thicknesses. However, the space between the roller pairs 18-22 is set to be narrower than the mount 14 and holder 15. Consequently, the mount 14 and holder 15 are transported through the image reading apparatus 10 by the deformation of the rollers 18a-22b.

Alternatively, when images on a roll of film 61 housed in a cartridge 60 are to be read, the user opens the lid 11 of the image reading apparatus 10, as shown in FIG. 4, and inserts the cartridge 60, as-is, into the loading chamber 13 from the opening 12. The cartridge motor 23 then engages the cartridge spool 68 such that when the cartridge motor 23 is driven forward, the roll of film 61 is scrolled out from the cartridge 60. The roll of film 61 that has been scrolled out is then guided to the winding chamber 25 by passing between the first rollers 19a-22a and the second rollers 19b-22b until the tip of the film 61 winds around the winding spool 26. The remainder of the roll of film 61 follows by the forward rotation of the winding spool 26 as the film 61 presses against the second rollers 19b-22b. Additionally, the curling of the roll of film 61 is simultaneously corrected while the position of the roll of film 61 is determined to be in the direction of the optical axis of the image reading optical system 40. While the roll of film 61 is being wound, the roll film 61 and the first rollers 19a-22a do not make contact.

The roll of film 61 is moved along the film transport path 17 in accordance with the forward rotation of the winding spool 26 while making contact with the second rollers 19b-22b. When the optical sensor 29 detects that the frame to be read has reached the image reading position, the image on the frame is read by the image reading optical system 40. Upon completing reading the image of the frame, the next frame is transported to the image reading position as the roll of film 61 is wound around the winding spool 26. The image on that frame is then read. This step is repeated until all the frames to be read have been completed, at which point the roll of film 61 is rewound into the cartridge 60 through the reverse driving of the cartridge motor 23. Then, the user can remove the cartridge 60, as-is, from the loading chamber 13 through the opening 12 by opening the lid 11.

In this way, the opening 12 is provided as an insertion opening for enabling the insertion and removal of the roll of film 61 housed in the cartridge 60 and the opening 16 is provided as an insertion opening for enabling the insertion and removal of 35 mm film housed in the slide mount 14 or the film holder 15. Therefore, it is possible to insert a roll of film 61 or 35 mm film into the image reading apparatus 10 in a single operation through insertion openings 12 and 16, respectively.

Additionally, while the images on one film type are being read, the user can prepare to read images from the other film type by inserting the other film type into the insertion opening. Therefore, the apparatus 10 is easy to use regardless of the film type.

It is also possible to arrange the driving system to scroll the roll of film 61 from the cartridge 60 or to take in the 35 mm film by separating the various insertion openings, simplifying the structure of the insertion unit.

In addition, while the roller pairs 18-22, slide mount 14 or film holder 15 are provided as the mechanism for transporting the 35 mm film, the mechanism for transporting the roll of film 61 is the winding spool 26 and second rollers 18b-22b.

Thus, it is possible to transport the roll of film 61 and the 35 mm film to the image reading position without requiring a particularly complex mechanism. In addition, the second rollers 18b-22b are used by both film types, thereby simplifying the structure of the transport system.

Furthermore, at the image reading position, the transport path 17 for the roll of film 61 and the 35 mm film can be the same, making it possible to read the images from both using a single image reading optical system 40.

Accordingly, it is possible to handle both a roll of film 61 and 35 mm film with a simply constructed image reading apparatus 10 having good operability and the capability to read the images of both types of film.

Now, a second embodiment of the present invention will be described.

Figure 5:
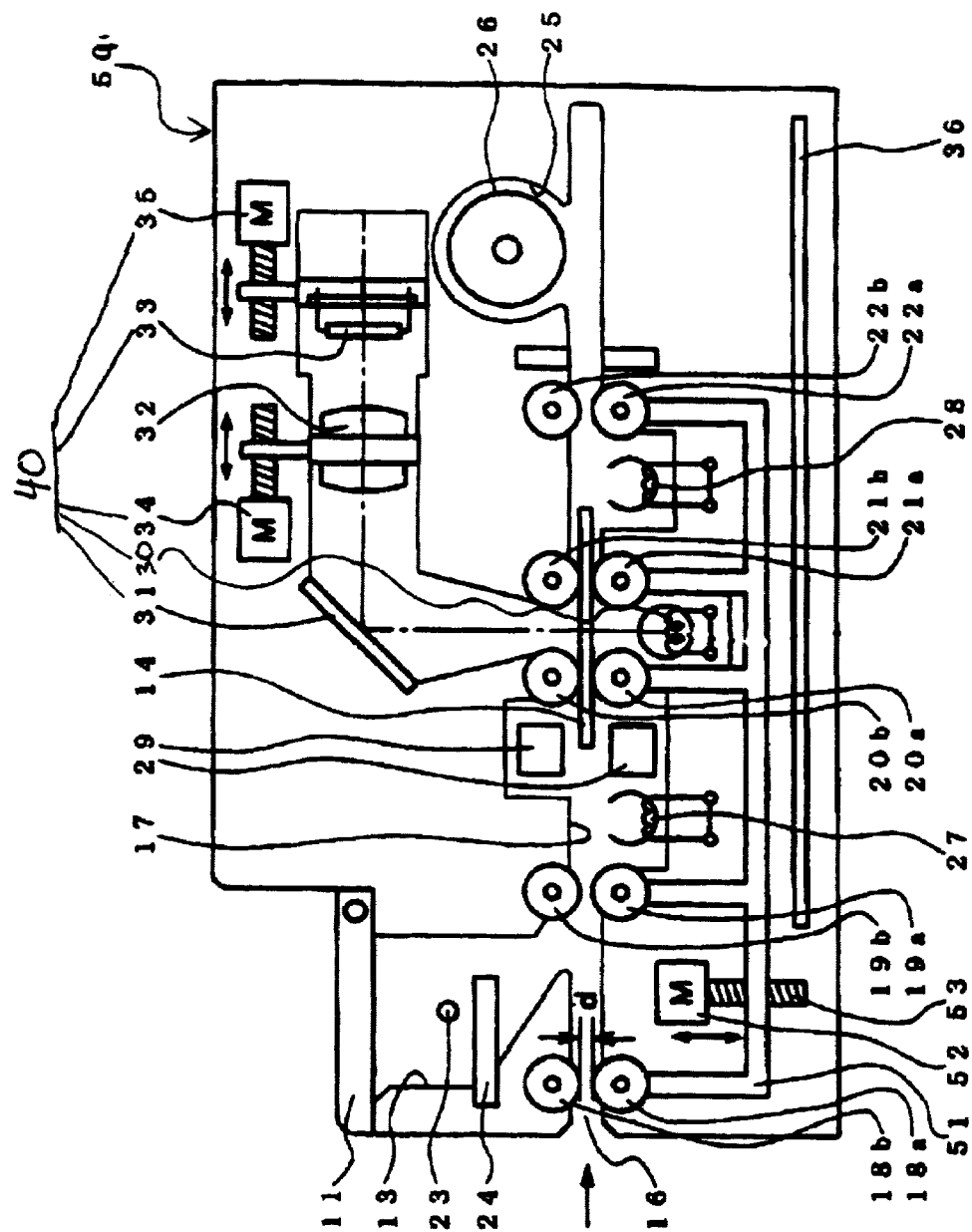
FIG. 5 is a cross-sectional view of the image reading apparatus according to the second embodiment of the invention.

FIG. 5 is a cross-sectional view of the image reading apparatus according to the second embodiment of the invention illustrating when the images on 35 mm film being housed in a slide mount 14 are read.

The image reading apparatus 50 of the second embodiment differs from the image reading apparatus 10 of the first embodiment in that it is possible to change the space between the opposing first rollers 18a-22a and the second rollers 18b-22b. The rotation shafts of the second rollers 18b-22b are anchored to the apparatus 50, while the first rollers 18a-22a are movable in the vertical direction. Therefore, it is possible to change the space between opposing rollers 18a-22b.

A boring screw 53 attached to the rotation shaft of a motor 52, such as, for example, a stepping motor, is coupled to the horizontal part of the support member 51. The support member 51 is guided by engaging a guide groove (not shown) provided along the optical axis of the image reading optical system 40 intersecting the film. Therefore, by rotating the boring screw 53 by driving the motor 52, it is possible to move the support member 51 along the guide groove (not shown). As a result, the first rollers 18a-22a may move toward or away from the second rollers 18b-22b as the space between the roller pairs 18-22 is changed.

The operation of the image reading apparatus 50 according to the second embodiment of the invention will now be described.

To read the images on 35 mm film housed in a slide mount 14, the user first designates the thickness of the slide mount 14 through a host computer (not shown). The space between opposing roller pairs 18-22 is set to be slightly narrower than the designated thickness after receiving the thickness information by driving the motor 52. Then, the user inserts the slide mount 14 into the opening 16 of the image reading apparatus 50, as shown by the arrow in FIG. 5. Thus, it is possible to transport this slide mount 14 interposed with a suitable spacing.

In the case of reading images on a roll of film 61 housed in a cartridge 60, the user designates this fact beforehand through a host computer after which a motor 52 is driven, making it possible to set the space between the roller pairs 18-22 wider than the thickness of the roll of film 61. Then, the roll of film 61 is transported in a manner similar to the first embodiment. Thus, with the image reading apparatus 50 of the second embodiment, it is possible to alter the space between the opposing roller pairs 18-22.

Normally, the thickness of the roll of film 61 is thinner than the thickness of the slide mount 14. Therefore, when the images on a roll of film 61 are to be read after having read the images on 35 mm film, it is not necessary to adjust the space of the roller pairs 18-22 since they are already narrow enough.

In addition, even if the thickness of the slide mount 14 or film holder 15 housing the 35 mm film differs, it is possible to transport the holding member interposed between the roller pairs 18-22 with a suitable spacing. Thus, even if the holding means is too thick, it is still possible to transport the holding means appropriately without applying an excessive burden to the rotation shafts of the rollers 18a-22b. It is even possible to transport thin holding means.

Although the structure of the second embodiment required that the designation of the thickness of the slide mount 14 and film holder 15 be made by the user through a host computer, the present invention is not limited to this structure. For example, an apparatus can have sensors that detect a cartridge 60, slide mount 14 or film holder 15 being inserted into the apparatus. The sensors would be provided near the loading chamber 13 or the opening 16 of the image reading apparatus 50. Through this structure, a determination is made by the CPU as to whether a roll of film 61 or other film type has been inserted into the apparatus 50. The CPU would then control the motor 52 on the basis of the type of film determined.

In addition, with the second embodiment, the structure was such that the space between the roller pairs 18-22 was changed through driving the motor 52 in accordance with the thickness information indicating the thickness of the inserted slide mount 14. The present invention is not limited to this structure. For example, a structure can be conceived wherein the roller pairs 18-22 are linked by springs, and the space is adjusted by the elongation or compression of the springs in accordance with the thickness of the slide mount 14 interposed between the roller pairs 18-22.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image reading apparatus for reading images on film, the apparatus comprising:
   an illumination device that illuminates the film;
   an image reader that reads images on said film illuminated by said illumination device at a reading position, said image reader outputting an image signal;

a first insertion opening for inserting a cartridge enclosing a first type of film;

a second insertion opening for inserting a second type of film that differs from said first type, the second insertion opening being defined separately from the first insertion opening; and a transporting device that transports the first type of film from the first insertion opening to the reading position through a transport path and that transports the second type of film from the second insertion opening to the reading position through the transport path, the transporting device including a first transporting device that introduces only the first type of film into the transport path, wherein said transporting device includes a second transporting device and a third transporting device, said second transporting device including at least one pair of opposing rollers arrange on opposite sides of a transport path, said at least one pair of rollers having a spacing wider than a thickness of said film, said spacing for receiving a holding means for holding said first type of film between said pairs of rollers and transporting said first type of film and said holding means to said reading position of said image reader, said third transporting device including a winding means for winding said second type of film using a roller of said at least one pair of rollers for transporting said second type of film to said reading position of said image reader.

2. The image reading apparatus according to claim 1, further comprising: control means for adjusting said spacing between said at least one pair of rollers, said spacing including a first spacing accommodating said holding means and a second spacing accommodating said second type of film.

3. The image reading apparatus according to claim 1, wherein said spacing is narrower than a thickness of said holding means.

4. The image reading apparatus according to claim 1, wherein said first type of film is 35 mm film.

5. The image reading apparatus according to claim 1, wherein said holding means is a frame of a slide mount of one of a slide mount and a film holder for holding 35 mm strip film.

6. An image reading apparatus for reading images on film, the apparatus comprising:

an illumination device that illuminates the film;

an image reader that reads images on said film illuminated by said illumination device at a reading position, said image reader outputting an image signal;

a first insertion opening for inserting a cartridge enclosing a first type of film;

a second insertion opening for inserting a second type of film that differs from said first type, the second insertion opening being defined separately from the first insertion opening; and a transporting device that transports the first type of film from the first insertion opening to the reading position through a transport path and that transports the second type of film from the second insertion opening to the reading position through the transport path, the transporting device including a first transporting device that introduces only the first type of film into the transport path, wherein said second type of film is a roll of film housed in a cartridge.

7. An image reading apparatus for reading images in film, the apparatus comprising:

a light source that illuminates film;

a photoelectric converter that converts light images produced when the light source illuminates the film at a reading position into image signals;

a first insertion opening that receives a cartridge enclosing a first type of film;

a second insertion opening that receives a second type of film, the second insertion opening being defined separately from the first insertion opening; and a film transport that extends from the first insertion opening to the reading position to transport the first type of film from the first insertion opening along a transport path to the reading position and that extends from the second insertion opening to the reading position to transport the second type of film from the second insertion opening to the reading position, the film transport including at least one pair of opposing rollers that introduces only the first type of film into the transport path, wherein said film transport includes at least one other pair of opposing rollers having a spacing wider than a thickness of said film, said spacing receiving a holder that holds said first type of film between said at least one other pair of rollers to transport said first type of film and said holder to said reading position and a winder that winds said second type of film using a roller of said at least one other pair of rollers to transport said second type of film to said reading position.

8. The image reading apparatus according to claim 7, further comprising: a controller coupled to said at least one other pair of rollers to adjust said spacing between said at least one other pair of rollers, said spacing including a first spacing accommodating said holder and a second spacing accommodating said second type of film.

9. The image reading apparatus according to claim 7, wherein said spacing is narrower than a thickness of said holder.

10. The image reading apparatus according to claim 7, wherein said first type of film is 35 mm film.

11. The image reading apparatus according to claim 7, wherein said holder is a frame of one of a slide mount and a film holder for holding 35 mm strip film.

12. An image reading apparatus for reading images in film, the apparatus comprising:

a light source that illuminates film;

a photoelectric converter that converts light images produced when the light source illuminates the film at a reading position into image signals;

a first insertion opening that receives a cartridge enclosing a first type of film;

a second insertion opening that receives a second type of film, the second insertion opening being defined separately from the first insertion opening; and a film transport that extends from the first insertion opening to the reading position to transport the first type of film from the first insertion opening along a transport path to the reading position and that extends from the second insertion opening to the reading position to transport the second type of film from the second insertion opening to the reading position, the film transport including at least one pair of opposing rollers that introduces only the first type of film into the transport path, wherein said second type of film is a roll of film housed in a cartridge.

13. An image reading apparatus for reading images on film, the apparatus comprising:

a light source that illuminates film;

a photoelectric converter that converts light images produced when the light source illuminates the film at a reading position into image signals;

a first conveyor that transports only a first type film to the reading position;

a second conveyor including two rollers arranged opposite each other with a spacing wider than a thickness of the first type of film to receive a holder of the first type of film, which mounts the first type of film, between the two rollers to transport the holder to the reading position;

a third conveyor including a winding mechanism that winds a second type of film, different from the first type of film, using one of the two rollers from the second conveyor to transport the second type of film to the reading position, at least a part of the second conveyor being different from the third conveyor;

a first insertion opening for inserting a flat cartridge enclosing a first type of film; and a second insertion opening for inserting a second type of film that differs from the first type, the second insertion opening being defined separately from the first insertion opening.

14. The image reading apparatus according to claim 13, wherein said spacing is narrower than a thickness of said holder.

15. The image reading apparatus according to claim 13, wherein said holder is a frame of one of a slide mount and a film holder for holding 35 mm strip film.

16. An image reading apparatus for reading images on film, the apparatus comprising:

a light source that illuminates film;

a photoelectric converter that converts light images produced when the light source illuminates the film at a reading position into image signals;

a conveyor that selectively transports a holder that holds a first type of film to the reading position and a second type of film, different from the first type of film, to the reading position using at least one of a first two rollers arranged opposite from each other, a position of origination of the first type of film at the conveyor being different from a position of origination of the second type of film at the conveyor, the conveyor including a second two rollers that transports only the first type of film;

a controller coupled to the conveyor to adjust the spacing between the first two rollers, the spacing including a first spacing accommodating the holder and a second spacing accommodating the second type of film; and a first insertion opening for inserting a flat cartridge enclosing a first type of film; and a second insertion opening for inserting a second type of film that differs from the first type, the second insertion opening being defined separately from the first insertion opening.

17. The image reading apparatus according to claim 16, wherein said spacing is narrower than a thickness of said holder when the conveyor transports said holder.

18. The image reading apparatus according to claim 16, wherein said holder is a frame of one of a slide mount and a film holder for holding 35 mm strip film.

* * * * *